Aug. 25, 1936.　　　　J. J. MURRAY　　　　2,052,484
BOOKLET
Filed March 16, 1935　　　2 Sheets-Sheet 1
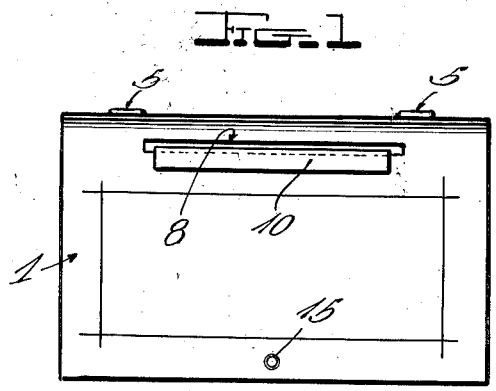
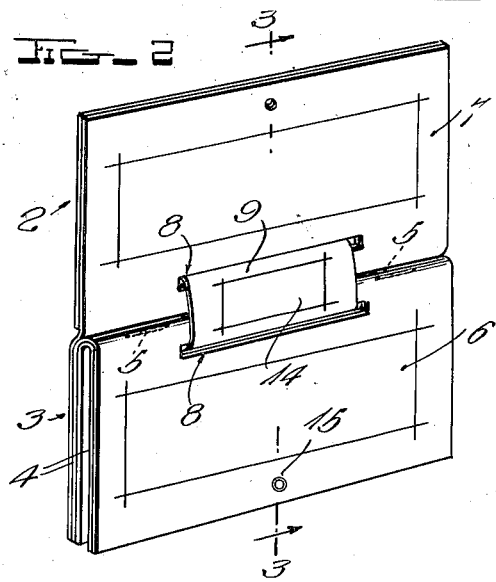
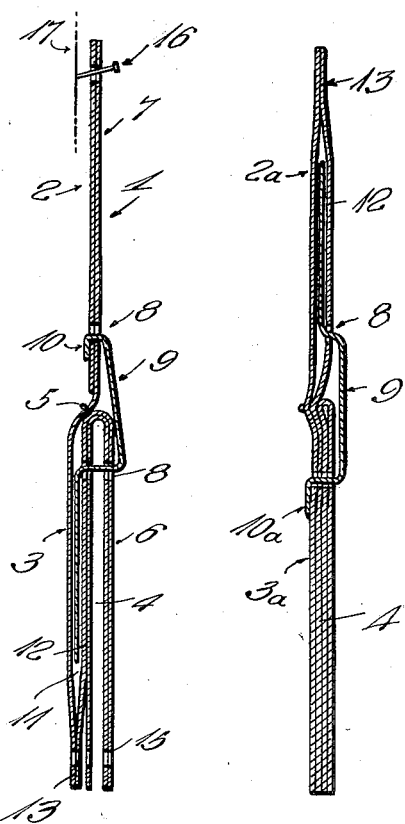
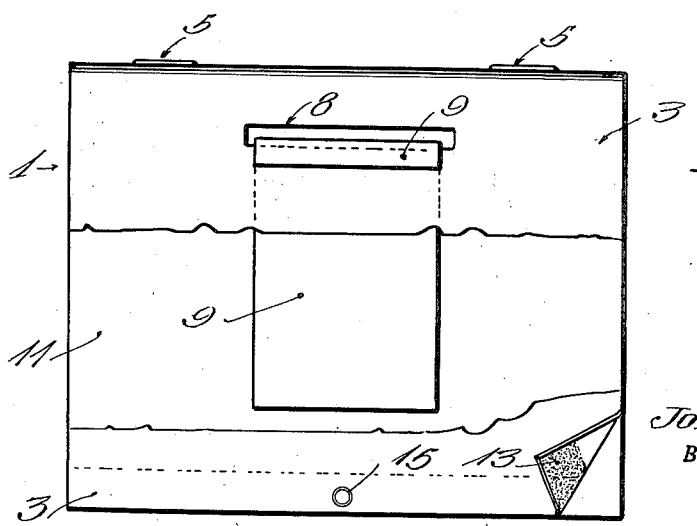
INVENTOR:
John J. Murray,
BY
ATTORNEY.

Aug. 25, 1936. J. J. MURRAY 2,052,484
BOOKLET
Filed March 16, 1935 2 Sheets-Sheet 2
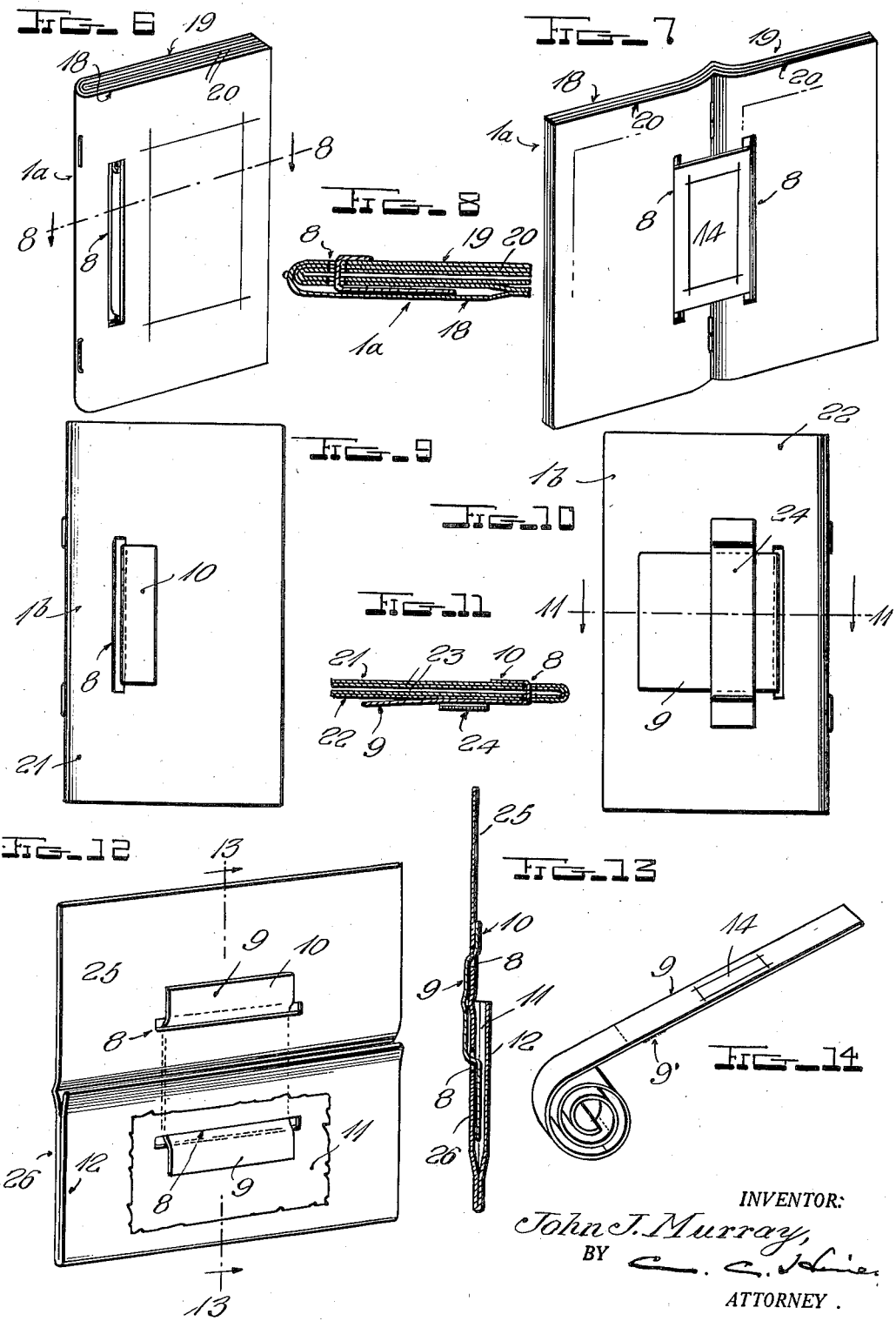
INVENTOR:
John J. Murray,
BY
ATTORNEY.

Patented Aug. 25, 1936

2,052,484

UNITED STATES PATENT OFFICE 2,052,484

BOOKLET

John J. Murray, Yonkers, N. Y.

Application March 16, 1935, Serial No. 11,493

10 Claims. (Cl. 281—15)

This invention relates to booklets generally, by which is meant booklets proper, folders, leaflets and similar printed matter, and has special reference to booklets intended for daily or other periodic or casual ready reference use, such, for example, as calendars, cook books or other recipe books, dockets, almanacs, maps, advertising art books containing advertising matter in association with a calendar, historical matter or other matter of constant or periodic interest to certain persons or to the public at large, music leaf booklets, cost sheet booklets, booklets containing formulae, arithmetical or other forms or tables, booklets containing in whole or in part advertising and topical matters, and other like booklets, leaflets or folders of a character more or less frequently consulted. More particularly the invention relates to a booklet, folder, leaflet or like article embodying, in addition to matter of any one or more of the kinds noted, an advertising or other display space or field, printed once only, but, through a novel construction and arrangement of the same and of the associated elements of the booklet, showing throughout the entire booklet or leaflet as the leaves are turned or exposed in conjunction with related leaves when the folder or the like is opened.

Booklets, folders and leaflets of this character are very generally used for advertising purposes and distributed gratuitously to the trade or public and the item of manufacturing cost is an important one to both small and large distributors, and particularly when one or more portions of the booklet are printed in two or more colors and the booklet is of art character. Where the distributor is advertising a certain product, and desires to have such product or his name and business, or both, prominently displayed in an attractive manner throughout the book, the cost of printing display matter in several colors on all the leaves of a book is very high, in many cases prohibitive to small manufacturers and others and, in fact, an item of expense important to large concerns customarily putting out large number of booklets for gratuitous distribution. Such booklets are also supplied by manufacturers to dealers in their goods with the business cards of the dealers printed therein or with display spaces left blank so that a dealer may have his business card printed therein if desired, the booklets in such case being distributed by the dealers. It is, of course, of great advertising value to the distributor to have his card printed on each page, or upon pages simultaneously displayed, so as to show throughout the booklet, but this is seldom done because of its great expense and the sacrifice of space intended for reading or other informatory matter. In order to reduce this cost of printing the distributor's name throughout the booklet, when a constant showing of the name is desired, it has been a common practice to bind the booklet in a cover of cardboard or the like, the cover having a portion projecting beyond the booklet on which the name is printed. While this requires but one single printing impression, on account of the large area of the full cover fewer imprints of the dealer's or distributor's name can be done at one time, and the assembling and binding of the cover and inside pages is necessarily costly.

One object of my invention is to provide a booklet, leaflet or folder which may bear matter of general or special interest throughout its pages in connection with an advertising or display strip, so located and associated with portions of the leaves of the booklet, as to be visible at any point in the booklet at which the booklet may be opened.

A further object of the invention is to provide a construction of the booklet whereby an advertising or other display strip, printed in as many colors as desired, may be presented and need be printed but once and at a single point only for use in the book, but nevertheless will show throughout the booklet.

A still further object of the invention is to provide a booklet or like article having bound leaves with openings or cut away portions in conjunction with an advertising or display strip extending through such openings or cut away portions so that a desired display field upon the strip will show throughout the booklet as the leaves are opened.

A still further object of the invention is to provide a booklet or like article of this character wherein the advertising or display strip is mounted for shifting movements to properly position the display field thereon as different leaves of the book are opened and to accommodate itself also to the shifting movements of the leaves as the book is closed.

A still further object of the invention is to provide a booklet or like article of this character whereby, if desired, the cover portions, including the display strip, or the latter alone, may bear display matter of multi-chrome character, while the leaves bear display matter of monochrome character, the two showing in contrast throughout the booklet, allowing an attractive type of booklet to be produced at a comparatively low cost.

A still further object of the invention is to provide a booklet or like article having a display strip of the character specified, which may be printed in any length, with the desired display matter printed at proper intervals thereon, whereby such strip may be cut up into lengths suitable for application to each booklet and furnished in completely printed form at a low cost.

A still further object of the invention is to provide a booklet, leaflet or folder of the character described embodying simple and effective means adapting the leaves of the booklet or article to serve as hangers, whereby the booklet or article may be suspended from a support.

With these and other objects in view, the invention consists of the features of construction, combination and arrangement of parts, hereinafter fully described and claimed, reference being had to the accompanying drawings, in which:—

Fig. 1 is a front view of an advertising calendar, booklet, leaflet or folder of hanger type embodying my invention.

Fig. 2 is a perspective view of the same showing the booklet as it appears with the first leaf open and engaged with a support.

Fig. 3 is a central vertical section through the booklet as it appears in Fig. 2.

Fig. 4 is a rear view of the closed booklet, showing the rear cover leaf partially broken away to show the strip receiving pocket.

Fig. 5 is a view similar to Fig. 3 showing a modification in which the pocketed leaf forms the front cover leaf instead of the rear cover leaf of the booklet.

Fig. 6 is a rear perspective view showing the embodiment of the invention in a horizontally opening booklet or like article.

Fig. 7 is a view of the same in opened condition.

Fig. 8 is a section on the line 8—8 of Fig. 6.

Fig. 9 is a front view showing the embodiment of the invention in a modified form of horizontally opening booklet or leaflet.

Fig. 10 is a rear elevation of the same.

Fig. 11 is a sectional view on line 11—11 of Fig. 10.

Fig. 12 is a rear perspective view showing the application of the invention to a folder, the folder appearing in open or out-spread condition and partly broken away to show the interior of the pocket therein.

Fig. 13 is a section on the line 13—13 of Fig. 12.

Fig. 14 is a view of the advertising strip.

In the practical embodiment of my invention as shown in Figs. 1 to 4, inclusive, 1 designates a booklet of generally rectangular form in plan, and having its major length in a horizontal direction, i. e., transverse to the plane of the drawing sheet. This booklet consists of any desired number of front and back leaves or covers 2 and 3 and any desired number of intermediate leaves 4 hingedly bound together at their line of fold by staples or other fastening members 5. In the illustrated example, the booklet is shown as composed of a stack of double-leaf sheets, which, when assembled, are folded along a central transverse line, thus disposing all the leaves in superposed relation. By this construction each leaf is integrally united to a fellow leaf, and all the leaves are joined by the fastening members along a flexible point of bend or hinging point which adapts the leaves to be easily turned up or opened without restriction or interference from the fastening members. The leaves, however, may be in the form of single-leaf sheets permanently bound together at their upper edges in any suitable manner or they may be of loose-leaf type, to admit of the use of interchangeable leaves when it is desired to provide a more or less permanent booklet, the printed subject-matter of which may be changed or amplified at certain intervals whenever desired.

The leaves of the booklet may be, if desired, of flexible paper or other flexible material, including the front and back leaves, or, if desired, the said front and back leaves may be of stiff or heavy paper in order to provide front and back covers of any suitable degree of durability. In practice, the obverse face 6 and reverse face 7 of each leaf may be printed, engraved or lithographed so as to bear any desired reading matter or matter of information. The obverse and reverse faces 6 and 7 of the leaves 4 of the booklet 1 shown in Figs. 1 to 4, inclusive may, for example, bear successively or in proper arrangement the month tables of a calendar, alone or in connection with suitable appropriate historical or other matter, or the obverse faces of the successive leaves may bear the calendar month tables and the reverse faces thereof other printed matter relative thereto or of other suitable sort. The construction of the booklet shown in Figs. 1 to 4, inclusive, is one in which the leaves open and close vertically, and the arrangement of such tables and reading matter upon the leaves may be such that upon the first or front cover leaf and one or more intermediate leaves being opened or turned up, and at all times thereafter, the printed matter shown upon juxtaposed surfaces of two adjacent leaves will simultaneously be exposed to the view of the observer.

By reference to Fig. 2, it will be seen that when the front cover leaf and one or more inside leaves are opened or turned up, the reading matter appearing upon the reverse face of one leaf and the obverse face of the succeeding leaf will be exposed to view, which arrangement of the reading matter on the obverse and reverse faces of succeeding leaves may prevail throughout the booklet as successive leaves are turned. The construction of the booklet is, therefore, such that the printed subject-matters appearing on simultaneously exposed pages of adjoining leaves may be of related character, for ready and convenient reference, each with respect to the other, such as one or more month calendar tables and historical events or astronomical data pertinent thereto. The arrangement of the printed matter also may be such as to show in connection with the calendar table of any month significant and appropriate information, for example, that stated flower or other seeds should be planted during such month, the house painted during such month, or other work done, at an appropriate time under the best climatic conditions. The tables and reading matter may, of course, be shown in connection with such advertising matter as the distributor of the booklet may desire to have incorporated therewith.

Figs. 1 to 4, inclusive, show a type of booklet which may be used, for example, for advertising purposes by a business concern desiring to keep its name before the public, and which booklet may be of the calendar type referred to or of any other suitable type, and hence have incorporated therein matter of general or particular interest, so that it will be preserved by the recipient for a determined period, during which the distributor has the benefit of the advertising presented thereby. An important feature of my invention consists in providing such a booklet with means whereby the name, business card or other advertising matter of the distributor need be printed once only but which will nevertheless show throughout the booklet as the leaves are turned. It will, of course, be understood that any desired advertising matter of the distributor may be printed on any or all the pages of the cover sheet, so that such advertising matter will show when the front cover leaf is opened; but, it is desirable, in addition to this, to provide means whereby the name of the distributor will also be prominently displayed throughout the booklet and at any point or page at which the booklet is opened. To this end, I provide the inside or intermediate leaves, and one of the cover leaves, with guide slits or openings 8 extending longitudinally of the leaf adjacent to the line of fold of each double leaf, or of the binding line of said leaves. In the structure shown in Figs. 1 to 4, inclusive, the front cover leaf 2 and each intermediate leaf 4 is shown as provided with a guide opening 8. These openings 8 are provided for the passage of an advertising or display strip 9. One end of this strip is passed through the opening 8 and turned down or bent at an angle and gummed or pasted to the obverse face of the front cover leaf 2, as shown at 10, and the strip is thence extended or threaded through the openings 8 of all the intermediate leaves and its opposite end, which is left free, is slidably disposed within a pocket 11 suitably provided in or upon the rear cover leaf 3. One manner of conveniently effecting this may be by providing the rear cover leaf 3 with an inturned fold or disposing upon the inner face thereof a sheet 12, which may be formed by the next adjacent intermediate leaf or a separate sheet, gummed or pasted thereto in any suitable manner, as indicated at 13, to form with the leaf 3 a pocket open at the top to receive and permit free sliding movement of the strip 9 therein. At a suitable point in its length the outer or display face of the strip 9 bears the desired display matter or is provided with a display field or space 14 in which may be printed the name of a manufacturer, dealer or other distributor, a trademark or name of a product, or a picture of a product or other matter designed to be kept in constant view. This display matter or field is so positioned on the strip as to be exposed between the front cover leaf and first intermediate leaf when the cover leaf is turned up, or between any two exposed intermediate leaves, as shown in Fig. 4, or between the last intermediate leaf and rear cover leaf, as the leaves are successively opened throughout the booklet or the booklet opened at any point.

It will be obvious, of course, that the purpose of slidably mounting the free end of the strip 9 in the pocket 11 is to permit such strip to shift with the cover leaf 2, as the latter is opened and closed, so as to bring the display portion 14 into position for display when the cover leaf is opened and adapt it to slide back when the cover leaf is closed, whereby the strip is adapted to be drawn out to display position when the booklet is opened and to be shifted back to normal position when the booklet is closed, but is prevented from being bent or crumpled and marred in appearance or otherwise injured in the opening and closing movements of the booklet. When the cover leaf is turned up or opened and the strip 9 drawn to display position, the strip will also be so disposed, as will be obvious by reference to Fig. 3, as to adapt each intermediate leaf to be turned up or opened without interference therefrom, the sliding action of the strip further adapting it to accommodate itself to the movements of the intermediate leaves in their opening and closing operations. The formation of the pocket 11 and arrangement of the free end of the strip therein provides a cover and housing for such end of the strip which prevents its injury or displacement.

Assuming, for example, that the distributor is a bank desiring to keep its name before the public, it will be understood that the cover leaves may be printed in one or more colors, if desired, with such advertising, or advertising and advisory matter, as the bank may desire to have appear, which will show when the booklet is closed and in addition the name and location of the bank may be printed on the strip 9 so that the bank's advertisement will continue to be displayed as the booklet is opened and throughout the full period of use of the booklet. It will be evident from this that while the cover leaves may be, if desired, made of more or less expensive material, and printed in a number of colors, the inside leaves may be made of less expensive paper and may be printed, for the sake of economy, in but a single color, so that an attractive booklet may be produced at a comparatively small expense. Economy may also be secured, and a highly attractive booklet still presented, if the matter contained in the field space of the strip 9 is printed in color, as such matter may be so printed as to produce a pleasing or aesthetic effect in association with matter on the inside leaves printed in but a single color only, by having the colors of the field 14 contrast with the color of the printed matter on the inside leaves. By properly regulating the arrangement and length of the guide openings 8 and the width of the strip 9, a display portion of comparatively large size may be provided upon the strip without undesirable intrusion upon or restriction of the surfaces or areas of the inside leaves designed to receive the printed matter thereon.

In practice, the exposed and secured end 10 of the strip may be suitably shaped and printed so as to give an ornamental appearance to the booklet at this point and it and the associated opening 8 may be properly formed or arranged to blend in with printed or other matter employed on the front surface of the cover page. The strip 9 to be used in connection with any particular booklet may be applied either before or after the booklet is fully bound and it may be printed and supplied in a roll of any desired length, with the display spaces 14 arranged at the required or predetermined proper intervals apart, so that individual strips for use in connection with each booklet may be severed along an indicated line from the main or roll strip. By this means a single printing of a roll strip of suitable length will supply individual strips for a large number of booklets, thus allowing the display strips to be economically printed. If desired, the line of cut between individual strips of a roll strip may be printed or otherwise suitably marked upon the strip at the same time the display matter is printed thereon, and the reverse face of the strip may also be suitably gummed, as at 9', adjacent to the lines of severance of the individual strips forming the end portions of the individual strips which are to be permanently fastened to a cover of the book. While this mode of producing strips in multiple is preferred, as stated, for reasons of economy, it will, of course, be understood that the strips, whenever desired may be individually formed and individually printed.

The result of forming and constructing a booklet in the manner above described is to provide a booklet which may be employed for any of the indicated purposes, and which may be made as ornamental and attractive or as plain, while still attractive, in a comparatively inexpensive manner. This booklet will be of value to the advertising distributor in enabling his name to be prominently displayed and kept before the public throughout a long period of time, while supplying the user with matter of general or special interest. If desired, each leaf of the book except the final cover leaf and the latter also, if preferred, may be provided at or near its edge opposite its hinged edge with an eyelet hole 15, adapting each leaf when turned to open position to be engaged with a nail, hook or other suitable holding or supporting member 16 projecting from a wall 17 or other suitable support, whereby the booklet may be suspended and held in open position and to simultaneously expose obverse and reverse faces of adjacent leaves successively throughout the book as the leaves are turned. The booklet may be supplied, however, with or without the eyelets.

In Fig. 5 I have shown a modified form of my invention in which the booklet is of the same construction as that shown in Figs. 1 to 4, inclusive but wherein the fixed end 10a of the display strip is secured to the rear cover leaf 3a and the free, sliding end of the strip is mounted in a pocket formed in or upon the front cover leaf 2a, in the same manner in which it is formed or provided upon the rear cover leaf in Figs. 1 to 4, inclusive, which modified construction may be employed in place of the construction disclosed in Figs. 1 to 4, inclusive, if desired.

In Figs. 6, 7 and 8 I have shown the application of my invention to a horizontally opening book, leaflet or the like 1a, which is of generally oblong rectangular form in plan, and having its major length in a vertical direction, i. e., parallel with the plane of the drawing sheet, and which is adapted to be opened from left to right or like an ordinary book. This booklet or leaflet comprises front and back cover leaves 18 and 19 and intermediate leaves 20, which may be formed and bound together in the same manner as in the constructions disclosed in Figs. 1 to 5, inclusive. The rear cover leaf 19 and the intermediate leaves are in this embodiment provided with the strip guide openings and the fixed end of the strip is secured to the rear cover leaf 19 while the sliding, free end of the strip is mounted in a pocket formed or provided upon the front cover leaf 18 in the same manner as that disclosed in Fig. 5. This embodiment of the invention, in the form of a booklet, leaflet or pamphlet may be used for any purposes, among others, for example, for the dissemination of information respecting a product or the products of a manufacturer, and the display portion of the strip 9 may show such product in one or more attractive colors.

In Figs. 9, 10 and 11 I have also shown the application of my invention to a horizontally opening book, leaflet or the like 1b, of a formation similar to that shown in Figs. 6, 7 and 8 and having front and back cover leaves 21 and 22 and intermediate leaves 23. The fixed end 10 of the display strip, however, is here passed through the slit 8 in the front cover leaf 21, while the sliding end of the display strip 9 is slidably fitted in a retaining pocket formed between the outer face of the rear cover leaf 22 and a retaining and guide strip 24, of paper or other suitable material, applied thereto.

In Figs. 12 and 13 I have shown the embodiment of my invention in a folder 1c or like piece of printed matter comprising front and rear leaves 25 and 26 preferably formed by folding a single sheet of paper or other sheet material along a central line to hingedly connect the leaves for opening and closing movements. The display strip 9 here has its fixed end 10 passed through the opening 8 in the leaf 25 and downturned and pasted or gummed to the obverse face of the leaf 25 and its rear end passed through the slit 8 in the rear leaf 26 and slidably fitted in a pocket 11 formed upon the outer surface of the rear leaf, either by providing said rear leaf with a backturned fold or applying thereto an outer sheet 12 in the same manner as that disclosed in the structure shown in Figs. 1 to 4, inclusive. This type of folder structure may be used strictly as stated, or it may be used as a picture post card, with suitable advertising and pictorial matter thereon, or it may be used as a return post card in which the rear pocket may serve as an order postal for ordering goods in which the pocket may be used as a receptacle for transmitting samples of goods from a manufacturer or other advertiser to a prospective customer, or for other analogous uses.

In this embodiment, as well as in all the other embodiments disclosed, the display panel or portion of the display strip may be printed in colors or to show a desired article of manufacture blending with or related to printed or other matter on the faces of the leaves.

From the foregoing description, taken in connection with the drawings, the construction and mode of use of my improved booklet or like article, will be readily understood, and it will be seen that the invention provides a booklet or similar article of the character and for the purpose described, by means of which a ready reference type of advertising and information booklet, of attractive appearance, may be produced at a low cost. Other advantages of the invention will be apparent from the foregoing description.

What I claim is:—

1. A booklet or other printed article having opposed hingedly connected leaves, said leaves having slits therein and one of said leaves having a pocket, said slits and pocket being arranged parallel with but spaced from the hinged portions of the leaves, and a display strip extending between the leaves so as to be exposed in the open position of said leaves, said strip being slidably engaged with the leaf having the pocket and fixed against movement to the other leaf.

2. A booklet or other printed article having opposed hingedly connected leaves, one of said leaves being provided with a guide slit and retaining means, said slit and retaining means being arranged parallel with but spaced from the hinged portions of the leaves, and a display strip fixed at one end to the opposed leaf and extending between said leaves so as to be exposed in the open position thereof and slidably engaging said guide slit and the retaining means of the first-named leaf.

3. A booklet or other printed article having opposed hingedly connected leaves, one of said leaves being provided with a guide slit and a retaining pocket arranged parallel with but spaced from the hinged portions of the leaves, and a display strip between said leaves so as to be exposed in the open position of said leaves and slidably engaged with said guide slit and pocket in the one leaf and fixed to the other leaf.

4. A booklet or other printed article comprising hingedly connected outer leaves and intermediate leaves, said intermediate leaves having guide slits formed therein parallel with but spaced from the hinging point of the leaves, and a display strip extending through the guide slits in the intermediate leaves and fixed to one outer leaf and slidably engaging the other outer leaf.

5. A booklet or other printed article comprising hinged outer and intermediate leaves, said outer leaves having guiding and retaining means, and said intermediate leaves being provided with guide slits therein parallel with but spaced from the hinging point of the leaves, and a display strip threaded through the guide slits in the intermediate leaves and fixed to one outer leaf and slidably engaging the guiding and retaining means of the other outer leaf.

6. A booklet or other printed article comprising hingedly connected outer or cover leaves and intermediate leaves, one of said outer leaves being provided on its outer face with a retainer and having a guide slit therein, and each of said intermediate leaves being provided with a guide slit, said slits being arranged parallel with but spaced from the hinging point of the leaves, and a display strip fixed at one end to the outer leaf and threaded through the guide slits in the intermediate leaves and slidably engaged at its other end with the guide slit and retainer of the outer leaf provided therewith.

7. A booklet or other printed article comprising outer leaves, one provided with a guide slit and having a retaining pocket on its outer face, and intermediate leaves, each provided with a guide slit therein, said leaves being hingedly connected and having the slits therein parallel with but spaced from the hinging point of the leaves, and a display strip fixed at one end to the other outer leaf, threaded loosely through the guide slits in the intermediate leaves and slidably engaged at its other end with the guide slit and retaining pocket of the outer leaf provided therewith.

8. A booklet or other printed article having opposed leaves hingedly connected at adjacent margins thereof, said leaves having slits therein arranged parallel with but spaced from their hinged margins, one of the leaves being also provided with a pocket parallel with the slits therein, and a flexible display strip extending between the leaves and through said slits, said strip being slidably engaged at one end with the pocket of the one leaf and fixed at its other end to the other leaf.

9. A booklet or other printed article having outer leaves and inner leaves hingedly connected at adjacent margins thereof, said inner leaves being provided with guide slits arranged parallel with but spaced from the hinged margins of the leaves, and a flexible display strip extending through the guide slits in the inner leaves and fixed to one of the outer leaves and slidably connected with the other outer leaf.

10. A booklet or other printed article having outer leaves and inner leaves hingedly connected at adjacent margins thereof, said inner leaves being provided with guide slits arranged parallel with but spaced from the hinged margins of the leaves, and one of said outer leaves being provided with a pocket, and a flexible display strip extending through the guide slits in the inner leaves and slidably engaged at one end with the pocket of the said outer leaf and fixed at its opposite end to the other outer leaf.

JOHN J. MURRAY.